United States Patent [19]

Ishikawa et al.

[11] Patent Number: 5,050,813
[45] Date of Patent: Sep. 24, 1991

[54] CORD RETAINING AND WINDING DEVICE

[76] Inventors: Takeshi Ishikawa; Atsuko Kobayashi, both of 420 E. 80th St., New York, N.Y. 10021

[21] Appl. No.: 457,150

[22] Filed: Dec. 26, 1989

[51] Int. Cl.⁵ .............................................. B65H 75/34
[52] U.S. Cl. ................................. 242/85.1; 242/86.1; 24/71.3; 24/129 R
[58] Field of Search .................... 242/77.1, 85.1, 86.1; 24/129 R, 115 A, 115 N, 115 H, 129 A, 71.3

[56] References Cited

U.S. PATENT DOCUMENTS

| | | | |
|---|---|---|---|
| 268,407 | 12/1882 | Hughes | 24/115 H |
| 2,778,582 | 1/1957 | Arthur | 242/85.1 |
| 2,880,992 | 4/1959 | Gubernick | 24/129 R X |
| 4,872,622 | 10/1989 | Mansfield | 242/85.1 |

Primary Examiner—Daniel P. Stodola
Assistant Examiner—John Q. Nguyen
Attorney, Agent, or Firm—Kanesaka and Takeuchi

[57] ABSTRACT

A cord retaining device is used for retaining at least one cord of an appliance therein to shorten lateral length. The cord retaining device comprises an elongated body shaped in a spiral form, and at least one groove formed in the elongated body. At least one cord of an appliance is situated and retained in the groove.

5 Claims, 1 Drawing Sheet

CORD RETAINING AND WINDING DEVICE

BACKGROUND OF THE INVENTION AND RELATED ART STATEMENT

The present invention relates to a cord retaining and winding device for shortening an electric cord or wire at a desired length.

Electric cords or wires attached to electric appliances, telephones and the like have generally sufficient length to connect the appliances to electric outlets or terminals. If an appliance is placed adjacent to an electric outlet, an electric cord, which is too long and is not used, is left behind the electric appliance or simply placed in front of the electric outlet.

The unused or too long electric cord may be bundled together. However, in case an electric cord is occasionally used in full length, it is troublesome to bundle the cord each time. Therefore, an unused electric cord is generally left behind an electric appliance.

The unused cord left behind an electric appliance may tangle together to cause trouble in cleaning. Also, the unused cord in front of an electric outlet looks bad, which may be caught when cleaning, walking and so on.

In some electric appliances, there is provided a cord winding device to withdraw and retract the electric cord. However, most of the electric appliances does not have such cord winding devices. In this case, bundling an unused or too long electric cord is the only way to shorten an electric cord. There is no device to shorten an electric cord at a desired length.

Accordingly, one object of the present invention is to provide a cord retaining device, which can neatly hold an unused cord to shorten appearance of a cord.

Another object of the present invention is to provide a cord retaining device as stated above, wherein the shortened cord can be extended to full original length.

A further object of the present invention is to provide a cord retaining device as stated above, wherein a plurality of cords can be shortened at the same time.

A still further object of the present invention is to provide a cord retaining device as stated above, which can be easily and economically manufactured.

Further objects and advantages of the invention will be apparent from the following description of the invention.

SUMMARY OF THE INVENTION

A cord retaining and winding device of the present invention is designed to hold or retain at least one cord therein. The cord retaining device basically comprises an elongated body shaped in a spiral form, and at least one groove formed in the elongated body so that at least one cord is situated and retained.

The groove includes a wide portion to receive the cord therein, and a narrow portion adjacent to an outer portion of the elongated body. When the cord is installed in the cord retaining device, the cord is inserted into the wide portion through the narrow portion. The narrow portion prevents the cord from dislocating from the device.

The elongated body includes a plurality of pair of notches at the narrow portion, from which the cord in the wide portion can be taken out of the device. If desired, the device may be cut at required length without using the notches.

The elongated body may have an elasticity. As a result, the cord wound in the spiral form can extend to desired length and return back to the original position. On the other hand, the elongated body may have ductility, so that the cord in the spiral form can extend to desired length without returning automatically.

The elongated body may have a large wide portion, or a plurality of wide portions. Consequently, a plurality of cords may be retained in one cord retaining device.

DETAILED DESCRIPTION

Referring to FIGS. 1-4, a first embodiment 10 of a cord retaining and winding device of the present invention is shown. The cord retaining device 10 is basically formed of an elongated body 11 wound in the spiral shape.

Figure 2:
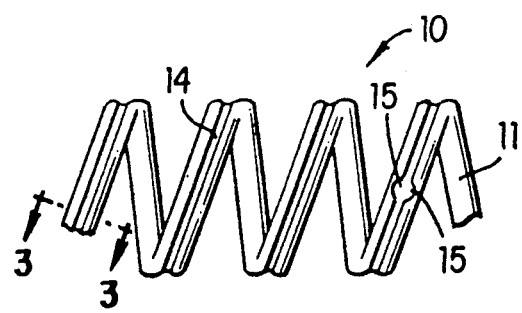
FIG. 2 is a side view of a cord retaining device as shown in FIG. 1, wherein the device is expanded laterally.

The elongated body 11 is made of a plastic material having elasticity. Generally, loops or round portions of the elongated body 11 are situated adjacent to each other. However, if the elongated body 11 is pulled, the loops extend as shown in FIG. 2 to expand the length.

Figure 3:
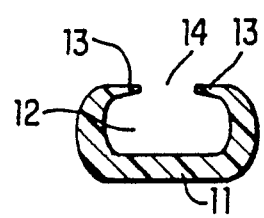
FIG. 3 is an enlarged section view taken along line 3—3 in FIG. 2.
Figure 4:
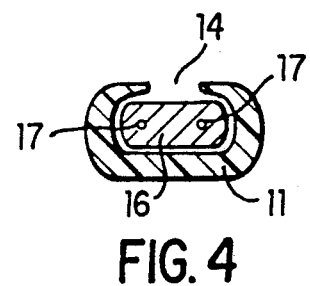
FIG. 4 is an enlarged section view similar to FIG. 3, wherein a cord is retained in the device.

As clearly shown in FIG. 3, the elongated body 11 is provided with an inner portion 12 and flanges 13 to form a slit 14 smaller in width than the inner portion 12. Also, the elongated body 11 includes a plurality of pair of notches 15 at the flanges 13.

In use, an electric cord 16 with wires 17 therein is pushed into the inner portion 12 through the slit 14. As a result, the cord 16 is wound along the elongated body 11. Since the cord 16 is wound in the spiral form along the elongated body 11, appearance of length of the cord 16 can be shortened.

One end of the cord 16 extends directly from an end of the inner portion 12. If the elongated body 11 is too long, the elongated body 11 may be cut to conform to required length of the cord 16, so that the other end of the cord 16 may extend from an opposite end of the inner portion 12. However, if desired, the cord 16 may be taken out of the elongated body through the notches 15 without cutting. In case the cord 16 to be shortened is too long, a plurality of the cord retaining devices 10 may be used.

Figure 1:
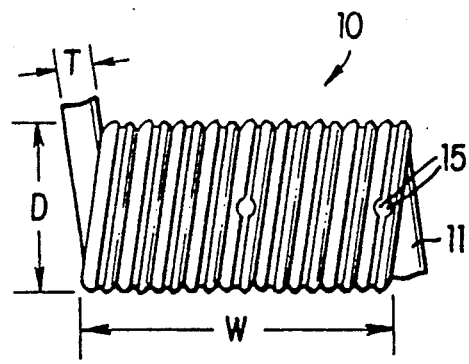
FIG. 1 is a side view of a part of a first embodiment of a cord retaining device of the invention.

The cord 16 is shortened approximately based on the following equation;

$$W = L/pi \cdot D \times T$$

wherein W is lateral length of the device 10; L is entire length of the cord 16; pi is ratio of circumference of a circle to its diameter; D is diameter of the device 10; and T is diameter of the elongated body 11. These characters are shown in FIG. 1.

In the device 10, the cord 16 is situated in the elongated body 11 in the spiral form. Therefore, the cord 16 can be neatly shortened in lateral length. However, in case the cord 16 is required to temporary extend its length, the elongated body 11 is pulled to extend the same. If force to extend the elongated body 11 is released, the cord 16 returns to the original spiral form.

Figure 5:
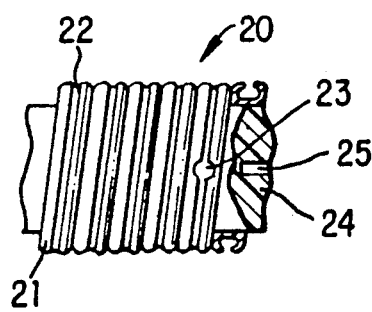
FIG. 5 is a side view of a second embodiment of a cord retaining device of the invention, wherein a part of the cord retaining device is cut.

FIG. 5 shows a second embodiment 20 of the cord retaining device of the invention. The cord retaining device 20 is formed of an elongated body 21 with an inner portion (not shown), a slit 22 and notches 23, as in the cord retaining device 10. However, loops or round portions of the elongated body 21 are connected with each other, so that the elongated body 21 does not expand laterally.

The elongated body 21 may be used as it is. However, the cord retaining device 20 is further provided with a core 24 with a metal rod 25 therein. The core 24 is made of a plastic material, which can bend but does not have elasticity. Therefore, the cord retaining device 20 in the cylindrical form can bend as desired by means of the metal rod 25.

Figure 6:
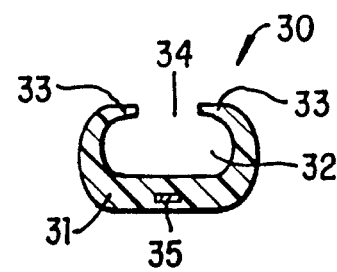
FIG. 6 is an enlarged section view, similar to FIG. 3, of a third embodiment of a cord retaining device of the invention.

FIG. 6 shows a third embodiment 30 of a cord retaining device of the invention. The cord retaining device 30 is provided with an elongated body 31 with an inner portion 32, flanges 33 and a slit 34, as in the cord retaining device 10. However, the elongated body 31 is made of a soft plastic material without elasticity. Therefore, the elongated body 31 in the spiral form may be extended in the lateral direction, wherein in case lateral tension is released, the elongated body 31 does not return to the original position.

In order to promote this feature, the cord retaining device 30 is provided with a metal core 35 inside the elongated body 31. In case the metal core 35 is made of a ductile metal, the elongated body 31 can be extended and bent as desired.

On the other hand, the metal core 35 may be made of a shape memory alloy, which is known already, wherein the metal core 35 is processed to return to the original spiral form at predetermined temperature. As a result, in a room temperature, the cord retaining device can be extended and bent as desired. In case the cord retaining device is to be returned to the original spiral form, heat is applied to the cord retaining device by means of a drier.

In the cord retaining device with the metal core made of a shape memory alloy, the device can be shaped and extended as desired. In case the device is to be shortened, the device is heated, so that the device can return to the original form.

Figure 7:
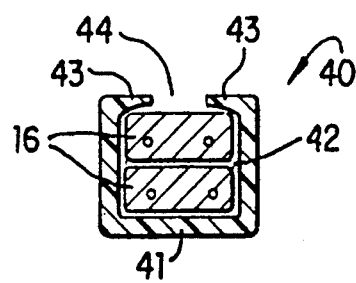
FIGS. 7 and 8 are enlarged section views, similar to FIG. 4, of fourth and fifth embodiments of a cord retaining device of the invention.

FIG. 7 shows a fourth embodiment 40 of the cord retaining device of the present invention. The cord retaining device 40 is provided with an elongated body 41 having an inner portion 42, flanges 43, a slit 44 and notches (not shown) similar to the notches 15, as in the cord retaining device 10.

However, the inner portion 42 of the device 40 is made large to receive two electric cords 16 vertically. In the device 40, the cord 16 adjacent the slit 44 may be taken out of the elongated body 41 through the notches, while the cord 16 on the bottom may be retained in the device 40. In the device 40, two cords can be retained in one device 40.

Figure 8:
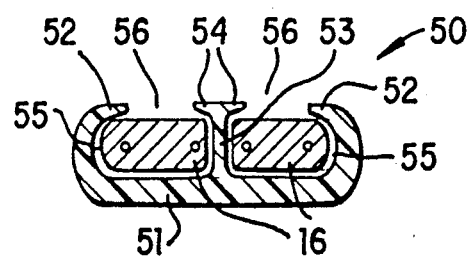

FIG. 8 shows a fifth embodiment 50 of a cord retaining device of the invention. The cord retaining device 50 is provided with an elongated body 51 having flanges 52 and notches (not show) similar to the notches 15, as in the cord retaining device 10.

However, the device 50 is further provided with a partition wall 53 with flanges 54, so that two inner portions 55 and slits 56 are formed. Therefore, two cords 16 are separately retained in the inner portions 55. Each cord 16 may be taken out of the device 50 through the notch.

In the present invention, a long electric cord which is not utilized can be shortened. If required, the electric cord in the cord retaining device can be easily extended.

While the invention has been explained with reference to the specific embodiments of the invention, the explanation is illustrative and the invention is limited only by the appended claims.

What is claimed is:

1. A cord retaining device adapted for retaining and winding at least one cord therein, said cord having a width and a thickness equal to or smaller than the width, comprising,
    a spirally wound elongated body having a plurality of convolutions defining a cylindrical form, said elongated body having a base portion, two side portions extending radially outwardly from the base portion, and axially extending flange portions at the outer ends of the side portions, axially adjacent side portions of neighboring convolutions of the elongated body substantially abutting against each other, said elongated body having ductility,
    said base portion, side portions, and flange portions defining at least one groove formed in the elongated body so that at least one cord is situated and retained therein, said groove including an inner portion having a width substantially corresponding to the width of the cord to be retained, and a narrow portion formed between the axially extending flange portions communicating with the inner portion, said narrow portion having a width smaller than the width of the cord, said cord, when situated in the groove, passing through the narrow portion and situated in the inner portion such that the width and length of the cord accord the width and length of the inner portion, whereby the cord is securely retained inside the groove,
    a plurality of pairs of notches provided on the elongated body adjacent the narrow portion, said cord being taken out of the elongated body through a desired pair of notches, and
    a metal strip embedded inside the elongated body so that the elongated body can be extended and bent as desired, said elongated body being made of a material different from that of the metal strip.

2. A cord retaining device according to claim 1, wherein said metal strip is made of a shape memory alloy so that when the elongated body is heated to a predetermined temperature, the elongated body returns to a spiral form.

3. A cord retaining device adapted for retaining and winding at least one cord therein, comprising,
    an elongated body shaped in a spiral form and having an outer portion facing radially outwardly of the elongated body in the spiral form, a plurality of grooves formed parallel to each other in the elongated body so that a plurality of cords is situated and retained in the respective grooves, each groove extending inside the elongated body from the outer portion and including a wide portion to receive the cord therein and a narrow portion adjacent the outer portion of the elongated body so that the cord is securely retained inside the wide portion, and a plurality of pairs of notches provided on the elongated body adjacent the narrow portion, said cord being taken out of the elongated body through a desired pair of notches.

4. A cord retaining device adapted for retaining and winding at least one cord therein, said cord having a width and a thickness equal to or smaller than the width, comprising, a spirally wound elongated body having a plurality of convolutions defining a cylindrical form, said elongated body having a base portion, two side portions extending radially outwardly from the base portion, and axially extending flange portions at the outer ends of the side portions, axially adjacent side portions of neighboring convolutions of the elongated body being attached to one another, said elongated body having ductility, said base portion, side portions, and flange portions defining at least one groove formed in the elongated body so that at least one cord is situated and retained therein, said groove including an inner portion having a width substantially corresponding to the width of the cord to be retained, and a narrow portion formed between the axially extending flange portions communicating with the inner portion, said narrow portion having a width smaller than the width of the cord, said cord, when situated in the groove, passing through the narrow portion and situated in the inner portion such that the width and length of the cord accord the width and length of the inner portion, whereby the cord is securely retained inside the groove, and a plurality of pairs of notches provided on the flange portions adjacent the narrow portion, said cord being taken out of the elongated body through a desired pair of notches.

5. A cord retaining device adapted for retaining and winding at least one cord therein, said cord having a width and a thickness equal to or smaller than the width, comprising, a spirally wound elongated body having a plurality of convolutions defining a cylindrical form, said elongated body having a base portion, two side portions extending radially outwardly from the base portion, and axially extending flange portions at the outer ends of the side portions, axially adjacent side portions of neighboring convolutions of the elongated body substantially abutting against each other, said elongated body having ductility, said base portion, side portions, and flange portions defining at least one groove formed in the elongated body so that at least one cord is situated and retained therein, said groove including an inner portion having a width substantially corresponding to the width of the cord to be retained, and a narrow portion formed between the axially extending flange portions communicating with the inner portion, said narrow portion having a width smaller than the width of the cord, said cord, when situated in the groove, passing through the narrow portion and situated in the inner portion such that the width and length of the cord accord the width and length of the inner portion, whereby the cord is securely retained inside the groove, a plurality of pairs of notches provided on the flange portions adjacent the narrow portion, said cord being taken out of the elongated body through a desired pair of notches, and a core with a metal rod, said core being in the form of a cylinder and situated inside the elongated body in the cylindrical form so that the elongated body in the form of a cylinder is bent as desired.

* * * * *